United States Patent
Fasullo et al.

(10) Patent No.: US 7,239,968 B2
(45) Date of Patent: Jul. 3, 2007

(54) METHOD AND APPARATUS FOR PREDICTING FAN FAILURE

(75) Inventors: Gregory H. Fasullo, Dallas, TX (US); Rick L. Barnett, Dallas, TX (US)

(73) Assignee: Valere Power, Inc., Richardson, TX (US)

( * ) Notice: Subject to any disclaimer, the term of this patent is extended or adjusted under 35 U.S.C. 154(b) by 26 days.

(21) Appl. No.: 10/766,731

(22) Filed: Jan. 28, 2004

(65) Prior Publication Data
US 2005/0165577 A1 Jul. 28, 2005

(51) Int. Cl.
*G01R 31/00* (2006.01)

(52) U.S. Cl. .................. 702/58; 702/60; 702/115; 702/142

(58) Field of Classification Search ................ 702/115, 702/142, 58, 60
See application file for complete search history.

(56) References Cited

U.S. PATENT DOCUMENTS

| | | | | |
|---|---|---|---|---|
| 4,344,479 A | * | 8/1982 | Bailey | 165/109.1 |
| 4,536,689 A | * | 8/1985 | Davidson | 318/565 |
| 4,839,852 A | * | 6/1989 | Knutsen | 700/24 |

* cited by examiner

*Primary Examiner*—Michael Nghiem
*Assistant Examiner*—Stephen J. Cherry
(74) *Attorney, Agent, or Firm*—Carr LLP

(57) ABSTRACT

A method and apparatus are provided for monitoring and adjusting angular speed or rotational frequency of a fan as well as wear. As a result of being able to monitor the angular speed or rotational frequency of a fan, a prediction of both wear and failure can be made. Due largely to increasing internal friction related to the amount of wear, the energy required to operate a fan at a given angular speed or rotational frequency varies. Hence, an algorithm and certain devices can be employed to make wear and failure predictions of either an mechanical or electrical fan based on energy consumption relative to an angular speed or rotational frequency.

28 Claims, 3 Drawing Sheets

METHOD AND APPARATUS FOR PREDICTING FAN FAILURE

FIELD OF THE INVENTION

The present invention relates generally to the operation of a mechanical or electrical fan and, more particularly, to predicting failure of the fan.

DESCRIPTION OF THE RELATED ART

Within a variety of applications today, fans are commonplace. Their applications can range from cooling to fluid movement. Generally speaking, though, fans can be a critical element in some applications, such as cooling. If a cooling fan for a computer fails, the computer can be seriously and irreparably damaged. If an electrical or mechanical fan for a vehicle fails, an engine or some other critical component can be damages. Conversely, fans for pumps, radial compressors, and axial compressors can cease to function with fan failure.

Because fans are essentially mechanical components, they are subject to high failure rates. Fan failure is often associated with fatiguing components, such as bearing wear, race wear, other contact component wear, physical condition changes and so forth. Mechanical component fatigue and wear then results in gradual performance loss. The time between mechanical fatigue or wear and fan failure due to excessive can be substantially long.

In order to maintain performance with a fatigued or worn fan, more energy is required. In other words, more mechanical or electrical energy must be supplied to operate a fatigued or worn fan at a desired performance level. If the amount of mechanical or electrical energy applied to a fatigued or worn fan remained constant, over time the fan would slow due to ever increasing friction.

Hence, conventional systems have been developed and employed a number of devices to combat fan failure. Typically, conventional systems utilize devices that monitor the angular speed of a fan. The monitor then alerts a user when the angular speed falls below a certain threshold. However, conventional systems typically do not employ other components to maintain a desired angular speed or rotational frequency.

Therefore, there is a need for a method and/or apparatus for monitoring and alerting a user of potential fan failure that addresses at least some of the problems associated with conventional methods and apparatuses for monitoring and alerting a user of potential fan failure.

SUMMARY OF THE INVENTION

The present invention provides an apparatus for determining fan failure or fan wear, comprising a processing unit, wherein the processing unit at least compares energy output to the fan with at least one angular speed of the fan over time to determine fan failure or fan wear.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combinations thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
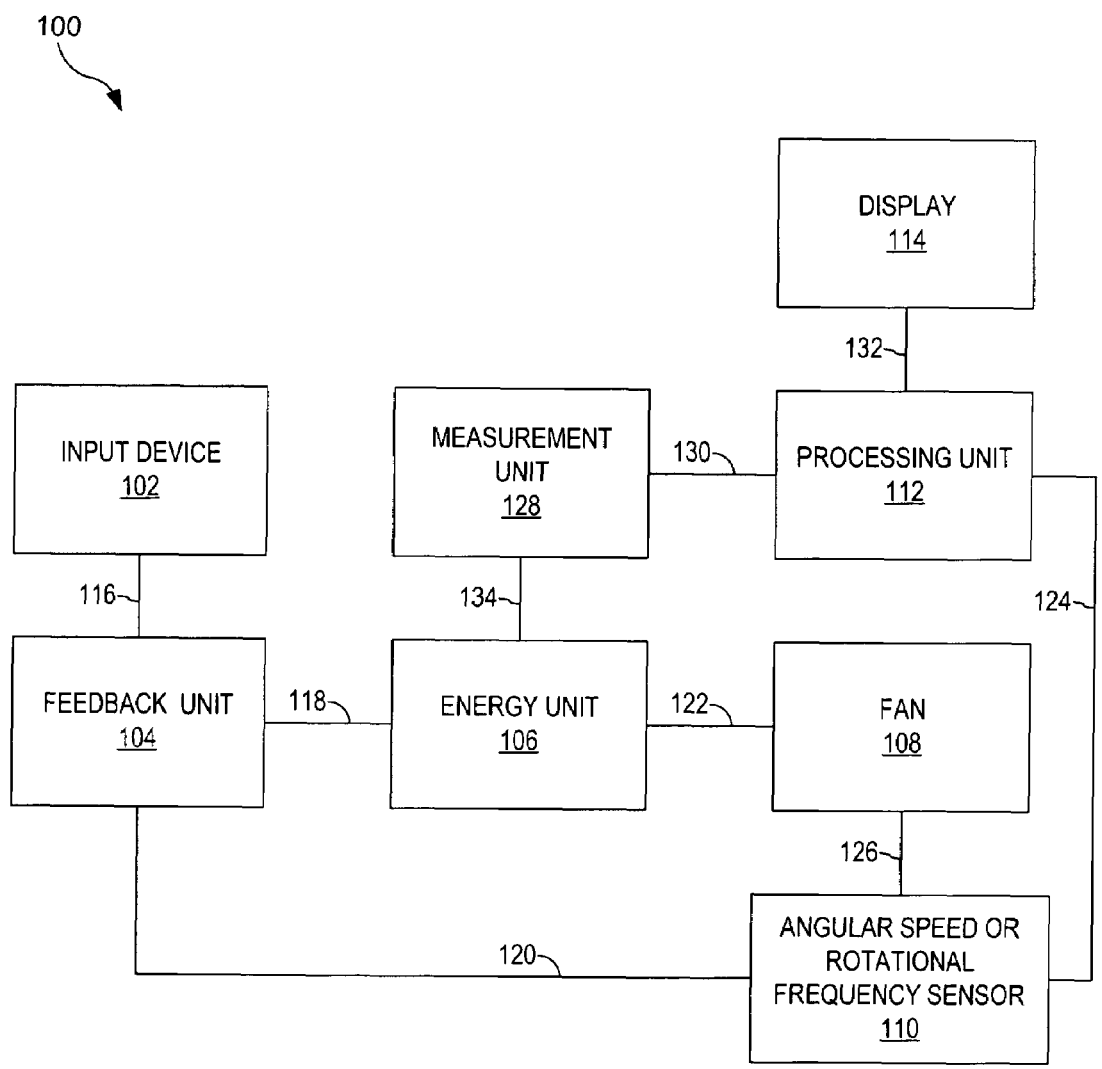
FIG. 1 is a block diagram depicting a fan monitoring and adjusting system.

Referring to FIG. 1 of the drawings, the reference numeral 100 generally designates a fan monitoring and adjusting system. The system 100 comprises an input device 102, a feedback unit 104, an energy unit 106, a fan 108, an angular speed sensor 110, a processing unit 112, a measurement unit 128, and a display 114.

The system initially operates applying energy on the fan 108. A user, other entity, or device, can set a certain speed of the fan through an input device 102. The input device can be a variety of device, such as a knob, a computer control system, and so forth. The desired fan speed is then communicated to the feedback unit 104 through a first communication channel 116. The feedback unit 104 then transmits an energy or voltage output signal to the energy unit 106 through a second communication channel 118. The energy unit 106 converts the energy or voltage output signal to an electrical or mechanical energy output through a first energy transmission channel 122. The energy unit 106 can be a variety of devices, such as a mechanical engine, an electrical power supply, and so forth. The electrical or mechanical energy output can be a variety of outputs, such as electrical energy or physical motion.

Beyond the initial applied energy to the fan, a series of other devices are utilized to maintain a desired fan speed. The measurement unit 128 measures the amount of energy or voltage delivered to the fan 108 by the energy unit 106 through a first measurement channel 134. The measurement unit 128 reports the amount of energy delivered to the fan 108 to the processing unit 112 through a third communication channel 130. There are a variety of energy measurements that can be reported, such as current and voltage. In conjunction with a reported energy delivered to the fan, an angular speed sensor 110 monitors the angular speed of the fan through a second measurement channel 126. An angular speed sensor 110 can be a variety of devices, such as a tachometer, a flow meter, and so forth. The angular speed or rotational frequency sensor 110 then reports the fan's angular speed or rotational frequency to the processing unit 112 through a fourth communication channel 124 and to the feedback unit 104 through a fifth communication channel 120.

Once all of the measurements have been taken, the energy output to the fan and predictions of fan failure or fan wear can be made. The feedback unit 104 can make an adjustment to the energy output signal in order to maintain the desired fan speed. The processing unit 112, on the other hand, can monitor historical trends of energy consumption and the angular speeds or rotational frequencies of the fan to predict failures or fan wear. The processing unit 112 can then transmit data relating to impending failures, predicted failures, or predicted fan wear to a display 114 though a sixth communication channel 132. The display can be a variety of devices, such as a computer system, an LED, a speaker, and so forth.

Figure 2:
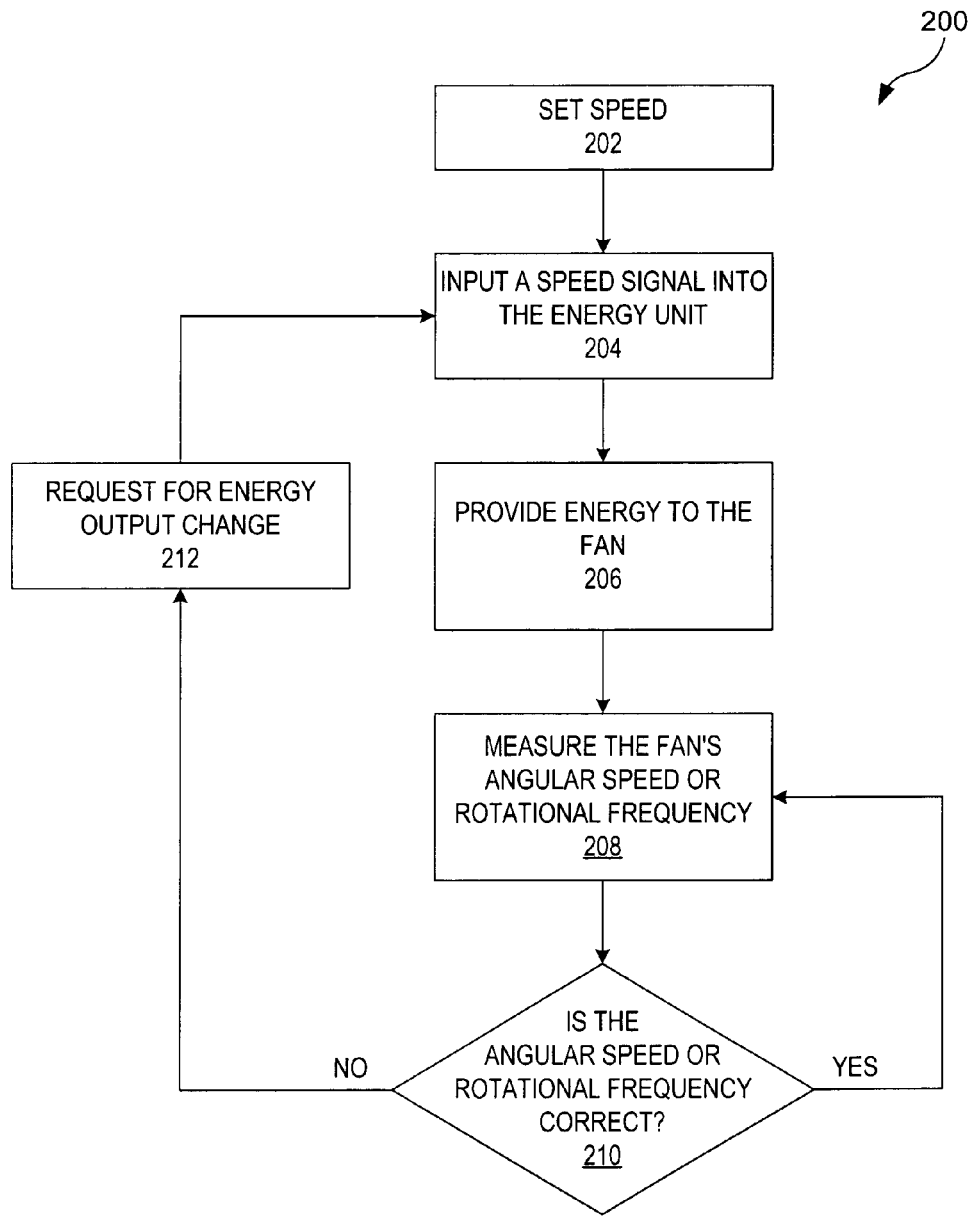
FIG. 2 is a flow chart depicting the adjustment of fan speed.

Referring to FIG. 2 of the drawings, the reference numeral 200 generally designates a flow chart depicting the adjustment of fan speed.

Conventional systems do input varying amounts of energy into a fan to achieve a specific angular speed or rotational frequency. However, conventional systems typically do not employ other components maintain a desired angular speed or rotational frequency. Instead a user, computer system, or other device will steadily increase the amount of energy input into a fan to achieve a desired fan speed at irregular intervals without regard for more minute changes in a fan's angular speed or rotational frequency.

In steps 202 and 204, the initial angular speed or rotational frequency of the fan is set. A user, computer system, or another entity can set the angular fan speed to a desired level in step 202. A variety of devices can be employed to set the fan's angular speed or rotational frequency. For example, a mechanical dial or a computer system can be used to provide the desired angular speed or rotational frequency. In step 204, these devices then deliver a signal to a energy unit. The energy unit can be a variety of devices, such as a mechanical engine, an electrical power supply, and so forth.

Once the desired speed has been selected, energy is then provided to the fan in step 206. There are a variety of manners to transmit energy to the fan. For example, a mechanical engine can provide motion, or electrical energy can be transmitted to an electrical motor. As the fan rotates, the angular speed or rotational frequency of the fan can be measured in step 204. To measure the fan's angular speed or rotational frequency, a variety of devices can be employed. For example, a tachometer or a flow meter can be utilized.

After the fan's angular speed or rotational frequency has been measured, determination can be made if the angular speed or rotational frequency is substantially equal to the desired speed in step 210. If the fan's angular speed or rotational frequency is substantially equal to the desired speed, then the angular speed or rotational frequency is continually measured in step 208 for any changes in the fan's angular speed or rotational frequency. However, if the speed is not substantially equal to the desired speed, then a request for a energy output change is made in step 212. The change in the energy output to the fan is proportional to the deviation between the fan's measured angular speed or rotational frequency and the fan's desired angular speed or rotational frequency. The speed signal and the energy output are then varied in steps 204 and 206, respectively.

Figure 3:
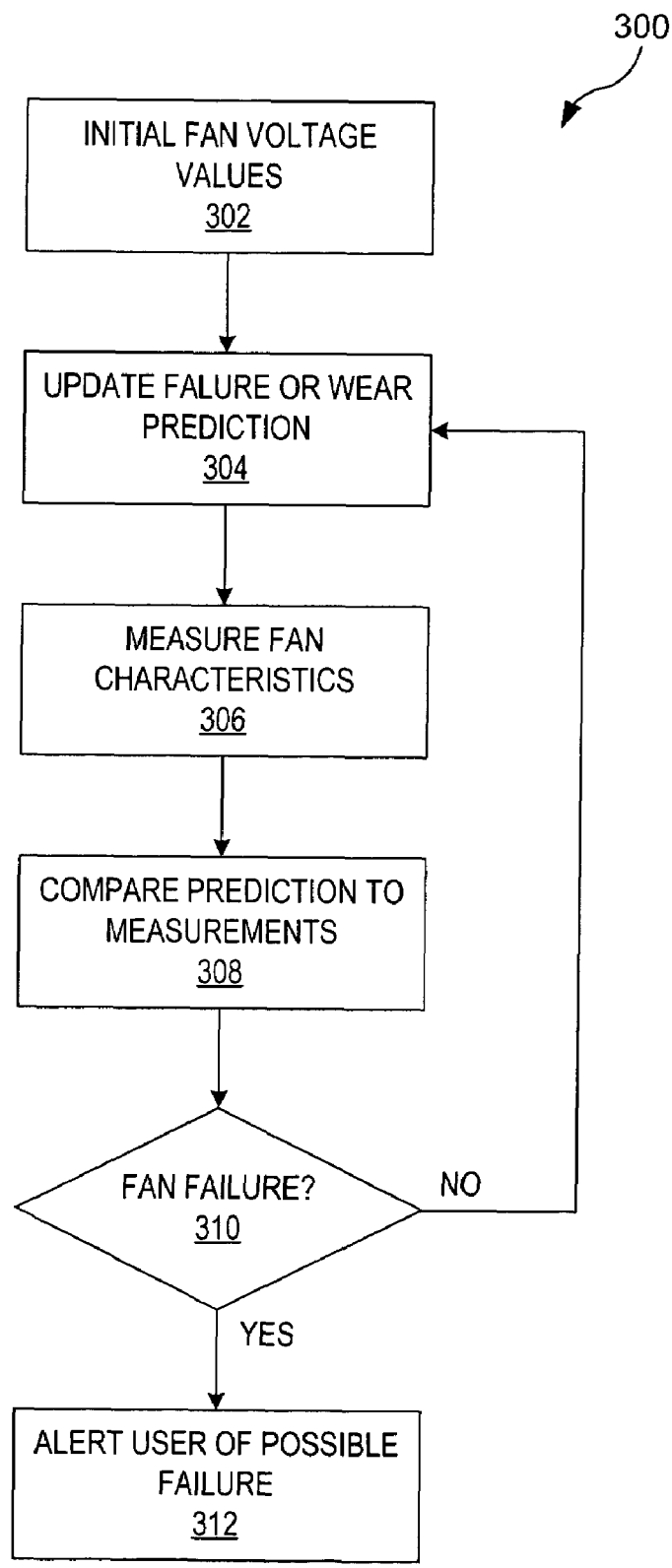
FIG. 3 is a flow chart relating to fan failure or fan wear prediction.

Referring to FIG. 3 of the drawings, the reference numeral 300 generally designates a flow chart depicting fan failure or fan wear prediction.

When the mechanical components of the fan begin to wear, energy consumption increases. Various components, such as bears and races, are subject to wear due to contact, evaporation of lubricants, and so forth. As the wear increases, internal friction within the fan causes energy consumption to increase because the applied force must increase proportionally with the amount of friction to overcome the ever-increasing friction. Therefore, the amount of wear can be determined during the life of a fan through the measurement of energy consumption because of the proportionality relationship between energy consumption and internal friction related to wear.

In steps 302 and 304, the prediction algorithm is initialized. An initial value corresponding to an initial desired angular speed or rotational frequency of the fan is measures in step 302. Once the initial value corresponding to the initial desired angular speed or rotational frequency has been measured, then the failure or fan wear prediction algorithm is updated. The failure or fan wear prediction algorithm can be a variety of types of algorithms, such as a historical trend monitor or a set consumption monitor.

With a historical trend monitor, the algorithm is able to build a model of wear of the fan. Based on energy consumption and angular speed or rotational frequency, a trend of wear can be measured as relative energy consumption increases for a given angular speed or rotational frequency. The historical model is significant in that each fan and system using a fan vary. Each fan and system can consume varying amounts of energy for a given angular speed or rotational frequency. Therefore, a more accurate measure of fan wear can be determined for each specific fan and/or system.

Additionally, a historical trend monitor is capable of measuring relative wear. Upon an initial start up of the system, measurements can be made as to the energy consumption. The initial measurements effectively operate as a calibration for the fan and the system for which the fan is attached at a given angular speed or rotational frequency. As the fan begins to wear, energy consumption will increase proportionally, at a given angular speed or rotational frequency, to the wear that results in internal friction. Therefore, based on the energy consumption relative to the angular speed or rotational frequency, a wear prediction can be made.

A set consumption monitor, on the other hand, is a less accurate means for measuring wear. At the onset, and throughout the usage of a fan, a maximum level of energy consumption for a given angular speed or rotational frequency of fan is set. With the set consumption monitor, there is no stored data relating to energy consumption relative to a fan's angular speed or rotational frequency. Essentially, the set consumption monitor operates as a switch where an alert is produced once a specific level of energy consumption is achieved.

However, there are a number of problems associated with a set consumption monitor. For example, if there are system or fan constraints that require more or less energy, then the maximum level can be too high or too low. Hence, the accuracy of the failure prediction algorithm decreases. Moreover, without the benefit of recorded data that a historical monitor possesses, a calibration typical cannot be made for the system and fan as to the energy consumption relative to the angular speed or rotational frequency. Therefore, an accurate prediction of wear is less likely with a set consumption monitor.

Once the prediction algorithm has been updated with energy consumption data, then a determination of failure or fan wear is made. A fan's characteristics are measured in step 306. The characteristics can include the fan's angular speed or rotational frequency and energy consumption as well as other measurements. The fan's characteristics are compared against the algorithm's limits to produce a prediction of failure or fan wear in step 308. The comparison can be accomplished in a variety of manners, such as a voltage comparison with a preset voltage limit, a complex trend analysis, and so forth. Once a comparison has been made, then there is a determination as to whether there is a possible fan failure in step 310. If there is no failure, then the algorithm can be updated with more historical data in step 304. However, if a possible failure, then an alert to the user or system is made in step 312. The alert can be accomplished in a variety of manner, such as a signal to a computer system, an audible alert to a user, and so forth.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. An apparatus for adjusting fan speed, comprising:
 a fan;
 an angular speed sensor, wherein the angular speed sensor measures at least one angular speed of the fan;
 an energy unit, wherein the energy unit provides energy output to the fan;
 a feedback unit, wherein the feedback unit:
  at least compares the at least one angular speed to a set angular speed level; and
  at least instructs the energy unit to adjust the energy output to the fan to at least substantially provide the set angular speed level; and
 a processing unit, wherein the processing unit:
  at least evaluates a comparison of the energy output to the fan with the angular speed of the fan at a first time and a second time; and
  at least compares the comparison at the first time with the comparison at the second time to determine fan failure or fan wear.

2. The apparatus of claim 1, wherein the angular speed sensor further comprises a tachometer.

3. The apparatus of claim 1, wherein the angular speed sensor further comprises a flow meter.

4. The apparatus of claim 1, wherein the fan further comprises:
 a plurality of fan blades; and
 an electric motor at least coupled to the plurality of fan blades.

5. The apparatus of claim 4, wherein the energy unit further comprises an adjustable electrical power supply.

6. The apparatus of claim 1, wherein the fan further comprises a plurality of fan blades.

7. The apparatus of claim 6, wherein the energy unit further comprises:
 a mechanical engine at least coupled to the plurality of fan blades; and
 an engine control unit, wherein the engine control unit at least controls mechanical energy output of the mechanical engine.

8. An apparatus for determining fan failure or fan wear, comprising:
 an energy unit, wherein the energy unit provides energy output to a fan;
 a measurement unit, wherein the measurement unit at least measures the energy output to the fan;
 an angular speed sensor, wherein the angular speed sensor measures an angular speed of the fan;
 a processing unit, wherein the processing unit at least:
  evaluates a comparison of the energy output to the fan with the angular speed of the fan at a first time and a second time; and
  compares the comparison at the first time with the comparison at the second time to determine fan failure or fan wear.

9. The apparatus of claim 8, wherein the angular speed sensor further comprises a tachometer.

10. The apparatus of claim 8, wherein the angular speed sensor further comprises a flow meter.

11. The apparatus of claim 8, wherein the fan further comprises:
 a plurality of fan blades; and
 an electric motor at least coupled to the plurality of fan blades.

12. The apparatus of claim 11, wherein the energy unit further comprises an adjustable electrical power supply.

13. The apparatus of claim 8, wherein the energy unit further comprises a mechanical engine at least coupled to the fan.

14. The apparatus of claim 8, wherein the processing unit comprises at least being configured to use historical data of the energy output to the fan with the at least one angular speed of the fan to determine if energy consumption is increasing.

15. An apparatus for predicting fan failure or fan wear, comprising a processing unit, wherein the processing unit at least compares energy output to the fan with angular speed of the fan over time to at least determine fan failure or fan wear and at least uses historical data of the energy output to the fan with the angular speed of the fan to determine if energy consumption is increasing, and wherein the processing unit outputs a result of the determination.

16. An apparatus for adjusting fan speed, comprising:
 a fan;
 an angular speed sensor, wherein the angular speed sensor measures at least one angular speed of the fan;
 an energy unit, wherein the energy unit provides energy output to the fan;
 a feedback unit, wherein the feedback unit:
  at least compares the at least one angular speed to a set angular speed level; and
  at least instructs the energy unit to adjust the energy output to the fan to at least provide the set angular speed level; and a processing unit, wherein the processing unit at least:

evaluates a comparison of the energy output to the fan with the angular speed of the fan at a first time and a second time; and compares the comparison at the first time with the comparison at the second time to predict fan failure or fan wear.

17. The apparatus of claim 16, wherein the angular speed sensor further comprises a tachometer.

18. The apparatus of claim 16, wherein the angular speed sensor further comprises an flow meter.

19. The apparatus of claim 16, wherein the fan further comprises:

a plurality of fan blades; and an electric motor at least coupled to the plurality of fan blades.

20. The apparatus of claim 19, wherein the energy unit further comprises an adjustable electrical power supply.

21. The apparatus of claim 16, wherein the fan further comprises a plurality of fan blades.

22. The apparatus of claim 21, wherein the energy unit further comprises:

a mechanical engine at least coupled to the plurality of fan blades; and an engine control unit, wherein the engine control unit at least controls mechanical energy output of the mechanical engine.

23. A method for determining fan failure or fan wear, comprising:

measuring an angular speed of a fan at a first time;

measuring an energy output to the fan at the first time;

comparing the angular speed at the first time to the energy output at the first time;

measuring an angular speed of the fan at a second time;

measuring an energy output to the fan at the second time;

comparing the angular speed at the second time to the energy output at the second time;

determining if there is an impending fan failure based upon the comparison at the first time and the comparison at the second time; and outputting a result of the determination.

24. The method of claim 23, wherein the step of determining if there is an impending fan failure further comprises:

storing the angular speed of the fan versus the energy output to the fan;

comparing the angular speed of the fan and the energy output to the fan; and determining if the energy output to the fan is at least increasing relative to the angular speed of the fan.

25. The method of claim 23, wherein the step of determining if there is an impending fan failure further comprises:

comparing the angular speed of the fan and the energy output to the fan to a predetermined consumption; and determining if the energy output to the fan is at least greater than the predetermined consumption.

26. A computer program product for determining fan failure, computer program product having a medium with a computer program embodied thereon, the computer program comprising:

computer code for measuring an angular speed of a fan at a first time;

computer code for measuring an energy output to the fan at the first time;

computer code for comparing the angular speed at the first time to the energy output at the first time;

computer code for measuring an angular speed of the fan at a second time;

computer code for measuring an energy output to the fan at the second time;

computer code for comparing the angular speed at the second time to the energy output at the second time;

computer code for determining if there is an impending fan failure based upon the comparison at the first time and the comparison at the second time; and computer code for outputting a result of the determination.

27. The computer program product of claim 26, wherein the step of determining if there is an impending fan failure further comprises:

computer code for storing the angular speed of the fan versus the energy output to the fan;

computer code for comparing the angular speed of the fan and the energy output to the fan; and computer code for determining if the energy output to the fan is at least increasing relative to the angular speed of the fan.

28. The computer program product of claim 26, wherein the computer code for determining if there is an impending fan failure further comprises:

computer code for comparing the angular speed of the fan and the energy output to the fan to a predetermined consumption; and computer code for determining if the energy output to the fan is at least greater than the predetermined consumption.

* * * * *